United States Patent
Bono et al.

(10) Patent No.: US 9,122,697 B1
(45) Date of Patent: Sep. 1, 2015

(54) UNIFIED DATA SERVICES FOR BLOCK AND FILE OBJECTS

(71) Applicant: EMC Corporation, Hopkinton, MA (US)

(72) Inventors: Jean-Pierre Bono, Westborough, MA (US); William Davenport, Burlington, MA (US); Miles A. de Forest, Bahama, NC (US); Philippe Armangau, Acton, MA (US); Walter C. Forrester, Berkeley Heights, NJ (US); Karl Owen, Chapel Hill, NC (US)

(73) Assignee: EMC Corporation, Hopkinton, MA (US)

( * ) Notice: Subject to any disclaimer, the term of this patent is extended or adjusted under 35 U.S.C. 154(b) by 196 days.

(21) Appl. No.: 13/853,284

(22) Filed: Mar. 29, 2013

(51) Int. Cl.
*G06F 17/30* (2006.01)

(52) U.S. Cl.
CPC .... *G06F 17/30194* (2013.01); *G06F 17/30091* (2013.01)

(58) Field of Classification Search
None
See application file for complete search history.

(56) References Cited

U.S. PATENT DOCUMENTS

| | | | |
|---|---|---|---|
| 2004/0030668 A1 * | 2/2004 | Pawlowski et al. | 707/1 |
| 2009/0055556 A1 * | 2/2009 | Lachmund et al. | 710/11 |
| 2010/0094847 A1 * | 4/2010 | Malan et al. | 707/705 |
| 2010/0306500 A1 * | 12/2010 | Mimatsu | 711/209 |
| 2014/0229440 A1 * | 8/2014 | Venkatesh et al. | 707/634 |

* cited by examiner

*Primary Examiner* — Hung Q Pham
(74) *Attorney, Agent, or Firm* — BainwoodHuang (57) ABSTRACT

An improved technique for a data storage apparatus that combines both block-based and file-based functionality in a unified data path architecture. The improved technique brings together IO processing of block-based storage systems and file-based storage systems by expressing both block-based objects (e.g., LUNs) and file-based objects (e.g., host file systems) in the form of files. These files are parts of an underlying set of internal file systems stored on a set of storage units served by a storage pool. Because block and file-based objects are all expressed as files of this set of internal file systems, a common set of services can be applied across block-based and file-based objects. In particular, enhanced data services such as compression, automated storage tiering and deduplication are provided across both types of object using one set of common mechanisms.

26 Claims, 10 Drawing Sheets

UNIFIED DATA SERVICES FOR BLOCK AND FILE OBJECTS

BACKGROUND

Block-based data storage systems conventionally include programming and hardware structures to provide block-based access to storage volumes. Such systems typically support Fibre Channel, iSCSI (Internet Small Computer System Interface), and/or other block-based protocols. With any of these block-based protocols, a data storage system may receive IO (input/output) requests from "hosts," i.e., computing devices accessing the data storage system, where the IO requests (also called "host IOs") specify locations to be read from or written to in the form of LUN identifiers (logical unit number, or volume) and particular offset ranges relative to the LUNs. For responding to IOs that specify read requests, the data storage system typically maps the specified LUNs and offsets to particular locations on disk drives or electronic flash drives, reads the data stored at the mapped locations, and returns the data to the hosts. For responding to IOs that specify write requests, the data storage system performs similar mappings, but writes the data to the designated locations. The IO requests may return results indicating whether the write requests succeeded or failed. An example of a block-based data storage system is the CLARiiON® system from EMC Corporation of Hopkinton, Mass.

File-based data storage systems are also known in the art. These systems include programming and hardware structures to provide file-based access to file systems. File-based data storage systems are sometimes referred to as NAS (Network Attached Storage) systems. Such systems typically support NFS (Network File System), CIFS (Common Internet File System), SMB (Server Message Block), and/or other file-based protocols. With file-based protocols, hosts can issue read and write IO requests by specifying particular file systems, paths, and file names. Internally to the data storage system, file system directories map the files specified by the host IOs to particular sets of blocks on internal volumes, which themselves are derived from disk drives or electronic flash drives. The data storage system accesses the mapped locations and performs the requested reads or writes. An example of a file-based data storage system is the Celerra® system from EMC Corporation of Hopkinton, Mass.

SUMMARY

The designs of block-based and file-based data storage systems often follow parallel paths. Indeed, it has been recognized that many of the features provided by block-based storage, such as replication, snaps, de-duplication, migration, failover, and non-disruptive upgrade, are similar to features provided for file-based data storage systems. Because of the different ways that block-based systems and file-based systems are typically constructed, however, it can be difficult to transfer advances in features for block-based systems to file-based systems, and vice-versa.

For user convenience, block-based and file-based storage systems are sometimes co-located, essentially side-by-side, to allow processing of both block-based and file-based host IOs in a single combined system. Such combined systems are often more difficult to support and maintain, however, than block-based or file-based systems individually. In addition, such systems tend to produce "stranded storage," i.e., storage that has been freed but cannot be reused because only an object of the same type (block-based or file-based) can reuse the storage but no current demand for storage from an object of the same type is pending. Such stranded storage can accumulate in these combined systems, allowing valuable storage resources to go unutilized.

In contrast with the separate block-based and file-based designs of conventional systems, an improved technique combines both block-based and file-based functionality in a unified data path architecture. The improved technique brings together IO processing of block-based storage systems and file-based storage systems by expressing both block-based objects and file-based objects in the form of files. These files are parts of an underlying, internal set of file systems, which is stored on a set of storage units served by a storage pool. Because both block-based objects and file-based objects are expressed as files, a common set of services can be applied across block-based and file-based objects for numerous operations, such as replication, snaps, de-duplication, migration, failover, non-disruptive upgrade, and/or many other services, as these services are performed similarly for both block and file objects on the same underlying type of object—a file.

In an example, the improved technique provides one or more enhanced data services that can readily support either block-based or file-based objects. As block-based objects (e.g., LUNs, block-based vVols, and so forth) and file-based objects (e.g., file systems, file-based vVols, VMDKs, VHDs, and so forth) are expressed as underlying files, the services can be applied to the underlying files whether they represent block-based objects or file-based objects.

In accordance with improvements hereof, certain embodiments are directed to a method of providing data storage services including enhanced data services to host computers using physical storage of a storage system. A layered operating stack is defined that includes a pool layer, a file system layer, a map layer and one or more service layers, where the pool layer defines and provides slices of the physical storage for storing host data, the file system layer has one or more internal file systems with respective files stored in corresponding sets of slices, and the map layer maps host objects to respective files of the file systems. The host objects include block-organized host objects and file-oriented host objects (such as mentioned above) each in a corresponding original object form. The pool, file system and map layers collectively provide a basic data storage service in which a file of an internal file system is stored by distributing blocks of the file across the slices in a manner maintaining the original object form and providing a basic level of storage efficiency. The service layers provide one or more automated enhanced data services, each applying a respective service transformation to the original object form to generate respective data in a service-specified form and storing the data in the slices, where the service-specified form provides a service level of efficiency generally greater than the basic level of storage efficiency. Example services include compression, deduplication and automated storage tiering (AST), each employing respective service forms and methods to achieve respective increases in storage efficiency and/or performance.

Other embodiments are directed to computerized apparatus and computer program products. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for data processing in a data storage system combines both block-based and file-based functionality in a unified data path architecture. The improved technique simplifies design and maintenance and allows a common set of functions to be applied to both block-based and file-based objects. In particular, enhanced data services are provided across both types of object using one set of common mechanisms.

Figure 1:
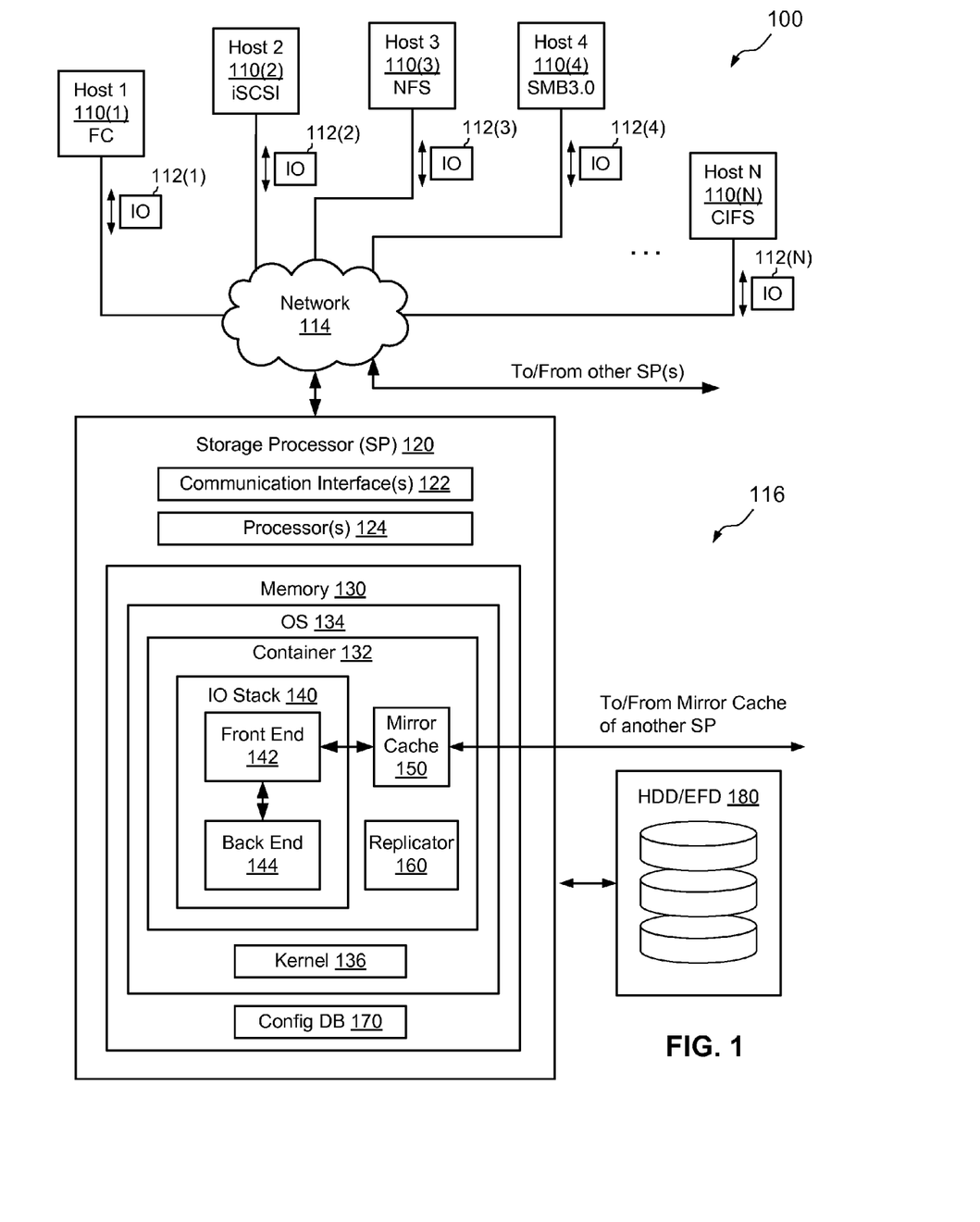
FIG. 1 is a block diagram showing a data storage apparatus in an example environment wherein improved techniques hereof may be practiced.

FIG. 1 shows an example environment 100 in which embodiments of the improved technique hereof can be practiced. Here, multiple host computing devices ("hosts"), shown as devices 110(1) through 110(N), access a data storage apparatus 116 over a network 114. The data storage apparatus 116 includes a storage processor, or "SP," 120 and storage 180. The storage 180 is provided, for example, in the form of hard disk drives (HDD) and/or electronic flash drives (EFD). Although not shown in FIG. 1, the data storage apparatus 116 may include multiple SPs like the SP 120. For instance, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of processing host IOs.

The network 114 can be any type of network or combination of networks, such as a storage area network (SAN), local area network (LAN), wide area network (WAN), the Internet, and/or some other type of network, for example. In an example, the hosts 110(1-N) connect to the SP 120 using various technologies. For example, the host 110(1) can connect to the SP 120 using Fibre Channel (e.g., through a SAN). The hosts 110(2-N) can connect to the SP 120 using TCP/IP, to support, for example, iSCSI, NFS, SMB 3.0, and CIFS. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to both block-based and file-based protocols and to respond to such IO requests 112(1-N) by reading or writing the storage 180.

The SP 120 is seen to include one or more communication interfaces 122, a set of processors 124, and memory 130. The communication interfaces 122 include, for example, adapters, such as SCSI target adapters and network interface adapters, for converting electronic and/or optical signals received from the network 114 to electronic form for use by the SP 120. The set of processors 124 includes one or more processing chips and/or assemblies. In a particular example, the set of processors 124 includes numerous multi-core CPUs. The memory 130 includes both volatile memory (e.g., RAM), and non-volatile memory, such as one or more ROMs, disk drives, solid state drives (SSDs), and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 are caused to carry out the operations of the software constructs. Although certain software constructs are specifically shown and described, it is understood that the memory 130 typically includes many other software constructs, which are not shown, such as various applications, processes, and daemons.

As shown, the memory 130 includes an operating system 134, such as Unix, Linux, or Windows™, for example. The operating system 134 includes a kernel 136. The memory 130 further includes a container 132. In an example, the container 132 is a software process that provides an isolated userspace execution context within the operating system 134. In various examples, the memory 130 may include multiple containers like the container 132, with each container providing its own isolated userspace instance. Although containers provide isolated environments that do not directly interact (and thus promote fault containment), different containers can run on the same kernel 136 and can communicate with one another using inter-process communication (IPC) mediated by the kernel 136. Containers are well-known features of Unix, Linux, and other operating systems.

In the example of FIG. 1, only a single container 132 is shown. Running within the container 132 is an IO stack 140, a mirror cache 150, and a replicator 160. The IO stack 140 provides an execution path for host IOs (e.g., 112(1-N)) and includes a front end 142 and a back end 144. The mirror cache 150 stores data for incoming writes and mirrors the data to cache on another SP. The replicator 160 makes local and/or remote copies of data for incoming writes. As the IO stack 140, mirror cache 150, and replicator 160 all run within the same container 132, the IO stack 140, mirror cache 150, and replicator 160 can communicate with one another using APIs (application program interfaces), i.e., without the need to use IPC.

The memory 130 also stores a configuration database 170. The configuration database 170 stores system configuration information. In other implementations, the configuration database 170 is stored elsewhere in the data storage apparatus 116, such as on a disk drive separate from the SP 120 but accessible to the SP 120, e.g., over a backplane or network.

In operation, the hosts 110(1-N) issue IO requests 112(1-N) to the data storage apparatus 116. The IO requests 112(1-N) may include both block-based requests and file-based requests. The SP 120 receives the IO requests 112(1-N) at the communication interfaces 122 and passes the IO requests to the IO stack 140 for further processing. At the front end 142, processing may include caching data provided with any write IO requests to the mirror cache 150, which may in turn cache the data to another SP. Also within the front end 142, mapping operations map LUNs and host file systems to underlying files stored in a set of internal file systems of the front end 142. Host IO requests received for reading and writing both LUNs and file systems are thus converted to reads and writes of respective files. The IO requests then propagate to the back end 144, where commands are executed for reading and/or writing the physical storage 180, agnostically to whether the data read and/or written is directed to a LUN or to a host file system.

Although FIG. 1 shows the front end 142 and the back end 144 together in an "integrated" form, the front end 142 and back end 144 may alternatively be provided on separate SPs. For example, the IO stack 140 may be implemented in a "modular" arrangement, with the front end 142 on one SP and the back end 144 on another SP. The IO stack 140 may further be implemented in a "gateway" arrangement, with multiple SPs running respective front ends 142 and with a back end provided within a separate storage array. The back end 144 performs processing that is similar to processing natively included in many block-based storage arrays. Multiple front ends 142 can thus connect to such arrays without the need for providing separate back ends.

Figure 2:
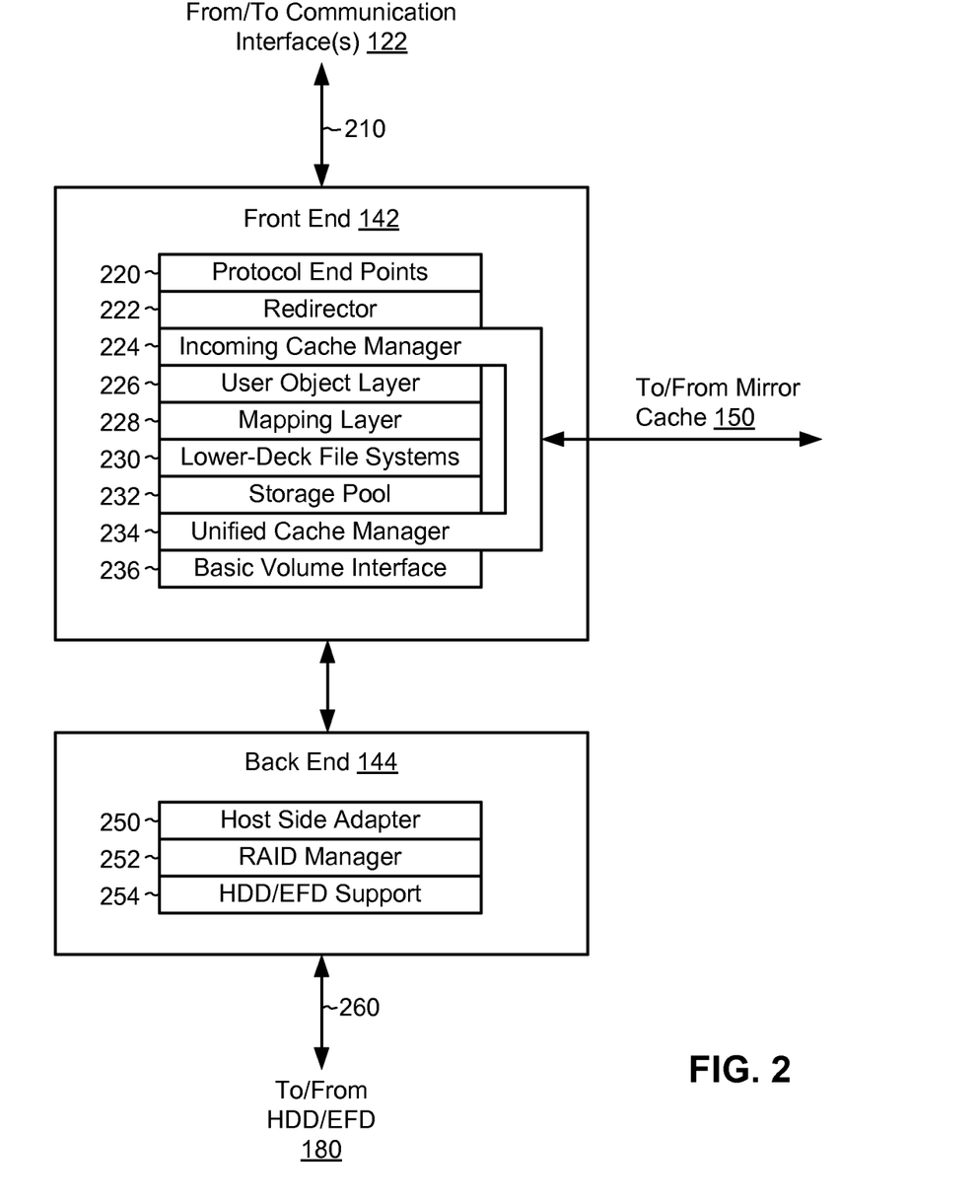
FIG. 2 is a block diagram showing particular example features of a storage processor of FIG. 1, including features of a front end and a back end of an IO stack.

FIG. 2 shows the front end 142 and back end 144 of the IO stack 140 in additional detail. Here, the front end 142 is seen to include protocol end points 220, a redirector 222, an incoming cache manager 224, a user object layer 226, a mapping layer 228, one or more lower-deck (internal) file systems 230, a storage pool 232, a unified cache manager 234, and a basic volume interface 236. The back end 144 is seen to include a host side adapter 250, a RAID (Redundant Array of Independent Disks) manager 252, and hard disk drive/electronic flash drive support 254.

Within the front end 142, protocol end points 220 receive the host IO requests 210 from the communication interfaces 122 and perform protocol-specific processing, such as stripping off header information and identifying data payloads. Processing then continues to the redirector 222.

The redirector 222 receives the host IOs and, under specified conditions, redirects the host IO requests to another SP. For example, the LUN specified in any block-based host IO request may be owned by a particular SP of the data storage apparatus 116. If the SP 120 receives a host IO request that is directed to a LUN owned by another SP, the redirector 222 sends the host IO to the SP that owns the LUN, at which point processing of the host IO request by the SP 120 ceases. However, if the redirector 222 detects that the LUN specified in a block-based host IO request is owned by the SP 120, the redirector allows the host IO request to continue to propagate through the front end 142. The redirector 222 performs no operation for file-based host IO requests. For host IO requests that are not redirected, processing continues to the incoming cache manager 224.

The incoming cache manager 224 provides low-latency responses to incoming host IO write requests. When a write IO request is received, the incoming cache manager 224 caches the data specified by the write request in the mirror cache 150. Operating in conjunction with the unified system cache 234, the incoming cache manager 224 directs the contents of the mirror cache 150 to be copied over a high-speed interconnect (e.g., a high-speed cable or bus) to a cache of a second SP of the data storage apparatus, where a duplicate copy of the data is stored. The data specified by the host write IO request are thus stored in two independent locations and are deemed to be persisted. Upon confirmation that the data have been successfully written to both the mirror cache 150 and the cache of the other SP, the incoming cache manager 224 acknowledges the write back to the originating host (i.e., the host of 110(1-N) that sent the write host IO). Using this arrangement, write requests are acknowledged quickly, without the need to wait until the requests propagate to the actual storage 180 or even to the unified cache manager 234, thereby providing a low level of latency in responding to write IOs. The data stored in the mirror cache 150 may eventually be destaged to the storage 180 (e.g., to the set of slices that store the LUN or file system being written to), but such destaging may be conducted when convenient and out of band with the processing of host IOs. Processing continues to the incoming user object layer 226.

The user object layer 226 presents underlying files representing LUNs and underlying files representing host file systems in a form recognized by the hosts (i.e., as LUNs and host file systems). For example, the user object layer 226 presents data stored in underlying files for block-based data as LUNs. The user object layer 226 also presents data stored in underlying files for file-based data as host file systems. In an example, the user object layer 226 includes an upper-deck file system for each host file system stored in a file of the lower-deck file system(s) 230 (described below). Each upper-deck file system presents files and directories of a host file system to the hosts 110(1-N), even though the host file system is represented internally as a file.

The mapping layer 228 maps host objects as presented in the user object layer 226 to corresponding underlying files stored in one or more lower-deck file systems 230. For LUNs, the mapping layer 228 converts a LUN identifier and offset range to a particular file in a lower-deck file system 230 and to a particular offset range within that file. Any set of blocks of a LUN identified in a host IO request are thus mapped to a set of blocks in the underlying file that represents the LUN. Similarly, for host file systems, the mapping layer 228 converts a given file or directory represented in an upper-deck file system of the user object layer 226 to a particular file in a lower-deck file system 230 and to a particular location within the file.

The lower-deck file system layer 230 represents LUNs and host file systems in the form of files. Any number of lower-deck file systems 230 may be provided. In one arrangement, a single lower-deck file system 230 may be provided to include any number of LUNs and/or host file systems, as well as their snaps (i.e., point-in-time copies). In another arrangement, a different lower-deck file system is provided for each primary object to be stored, i.e., for each LUN and for each host file system. The lower-deck file system for any primary object may include a file storing the object itself, as well as files storing any snaps of the object. Each lower-deck file system 230 has an inode table, which provides a unique inode for each file stored in the lower-deck file system 230. The inode table of each lower-deck file system stores properties of each file in the respective lower-deck file system, such as ownership and block locations at which the file's data are stored. Lower-deck file systems are built upon storage elements managed by a storage pool 232.

The storage pool 232 organizes elements of the storage 180 in the form of slices. A "slice" is an increment of storage space, such as 256 MB in size, which is drawn from the storage 180. The pool 232 may allocate slices to lower-deck file systems 230 for use in storing their files. The pool 232 may also deallocate slices from lower-deck file systems 230 if the storage provided by the slices is no longer required. In an example, the storage pool 232 creates slices by accessing RAID groups formed from the storage 180, dividing the RAID groups into FLUs (Flare LUNs), and further dividing the FLU's into slices.

The unified cache manager 234 provides caching services for data stored in the lower-deck file systems 230. In some examples, the unified cache manager 234 directs data specified by host writes to local RAM or flash memory and thus avoids the need to access the storage 180, which is typically more remote than the local RAM or flash memory and takes more time to access. In some examples, the unified cache manager 234 also directs data returned in response to read IO requests to be stored in local RAM or flash memory for fast access in the event that subsequent host IO requests require the same data. In some examples, the local RAM or flash memory may store the only valid copy of host data, with writes to the storage 180 being deferred and, in cases where host data needs to be stored only transiently, avoided altogether.

The basic volume interface 236 is arranged to send host IOs to the back end 144 when the back end 144 is provided on another SP of the data storage apparatus 116 or when the back end 144 is provided on a separate array. In an example, the basic volume interface 236 converts host IOs propagating out of the front end 142 to a block-based protocol, such as Fibre Channel. After being processed by the basic volume interface 236, processing continues to the back end 144.

Within the back end 144, the host side adapter 250 receives the host IO and extracts the host IO content. In some implementations, such as the "integrated" arrangement shown in FIG. 1, the basic volume interface 236 and host side adapter 250 may be omitted or may be made to perform no operation.

The RAID manager 252 accesses the particular slice or slices being written or read using RAID protocols. In some examples, the RAID manager 252 also performs out-of-band operations of maintaining RAID groups, such as swapping out failing disk elements and applying erasure coding to restore required redundancy.

The hard disk drive/electronic flash drive support 254 includes drivers that perform the actual reading from or writing to the storage 180.

Although the above-described components of the IO stack 140 are presented in a particular order, this order can be varied. For example, the incoming cache manager 224 can be located above the redirector 222. Also, multiple cache managers can be provided at different locations within the IO stack 140.

Figure 3:
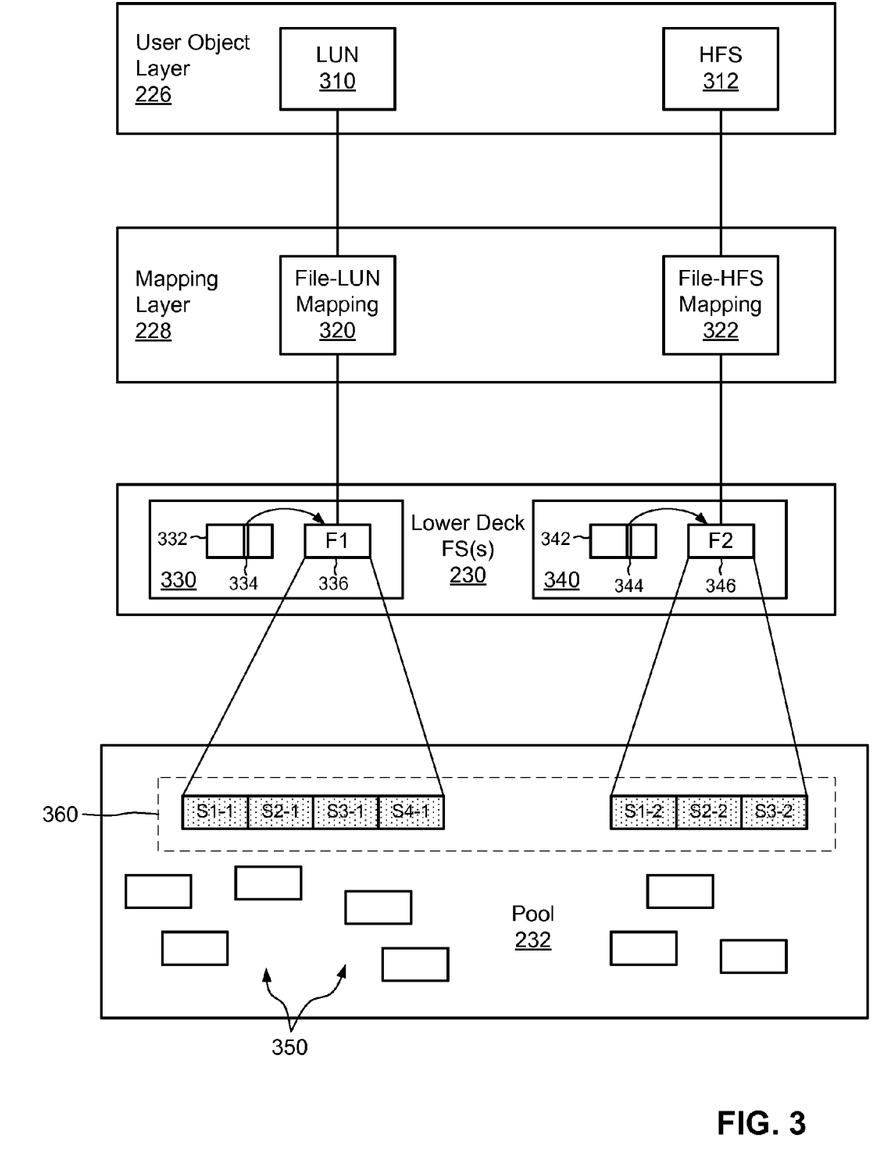
FIG. 3 is a block diagram showing example features of the front end of FIG. 2 in additional detail, including lower-deck file systems built upon storage units (e.g., slices) from a storage pool.

FIG. 3 shows portions of the front end 142 in additional detail. Here, the user object layer 226 includes a representation of a LUN 310 and of an HFS (host file system) 312, and the mapping layer 228 includes a file-to-LUN mapping 320 and a file-to-HFS mapping 322. The file-to-LUN mapping 320 maps the LUN 310 to a first file F1 (336), and the file-to-HFS mapping 322 maps the HFS 312 to a second file F2 (346). Through the file-to-LUN mapping 320, any set of blocks identified in the LUN 310 by a host IO is mapped to a corresponding set of blocks within the first file 336. Similarly, through the file-to-HFS mapping 322, any file or directory of the HFS 312 is mapped to a corresponding set of blocks within the second file 346.

The first file 336 and the second file 346 are included within the lower-deck file systems 230. In this example, a first lower-deck file system 330 includes the first file 336 and a second lower-deck file system 340 includes the second file 346. Each of the lower-deck file systems 330 and 340 includes an inode table, 332 and 342, respectively. The inode tables 332 and 342 provide information about files in respective lower-deck file systems in the form of inodes. For example, the inode table 332 of the first lower-deck file system 330 includes an inode 334, which provides file-specific information about the first file 336. Similarly, the inode table 342 of the second lower-deck file system 340 includes an inode 344, which provides file-specific information about the second file 346. The information stored in each inode includes location information (e.g., block locations) where the respective file is stored, and may thus be accessed as metadata to identify the locations of the files 336 and 346.

Although a single file is shown for each of the lower-deck file systems 330 and 340, it is understood that each of the lower-deck file systems 330 and 340 may include any number of files, each with its own entry in the respective inode table. In one example, each lower-deck file system stores not only the file F1 or F2 for the LUN 310 or HFS 312, but also snaps of those objects. For instance, the first lower-deck file system 330 stores the first file 336 along with a different file for every snap of the LUN 310. Similarly, the second lower-deck file system 340 stores the second file 346 along with a different file for every snap of the HFS 312.

As shown, a set of slices 360 is allocated by the storage pool 232 for storing the first file 336 and the second file 346. In the example show, slices S1-1 through S4-1 are used for storing the first file 336, and slices S1-2 through S3-2 are used for storing the second file 346. The data that make up the LUN 310 are thus stored in the slices S1-1 through S4-1, whereas the data that make up the HFS 312 are stored in the slices S1-2 through S3-2. In an example, the storage pool 232 allocates slices 350 to the set of file systems 230 in an on-demand manner, e.g., as the first file 236 and the second file 246 require additional storage. The storage pool 232 can also deallocate slices from the set of file systems 230 when all the currently allocated slices are no longer required.

In some examples, each of the lower-deck file systems 330 and 340 is associated with a respective volume, such as a sparse LUN. Sparse LUNs provide an additional layer of mapping between the lower-deck file systems 230 and the pool 232 and allow the lower-deck file systems to operate as file systems normally do, by accessing underlying volumes. Additional details about sparse LUNs and their relation to lower-deck file systems may be found in U.S. Pat. No. 7,631,155, which is hereby incorporated by reference in its entirety. The incorporated patent uses the term "container file systems" to refer to constructs similar to the lower-deck file systems disclosed herein.

Figure 4A:
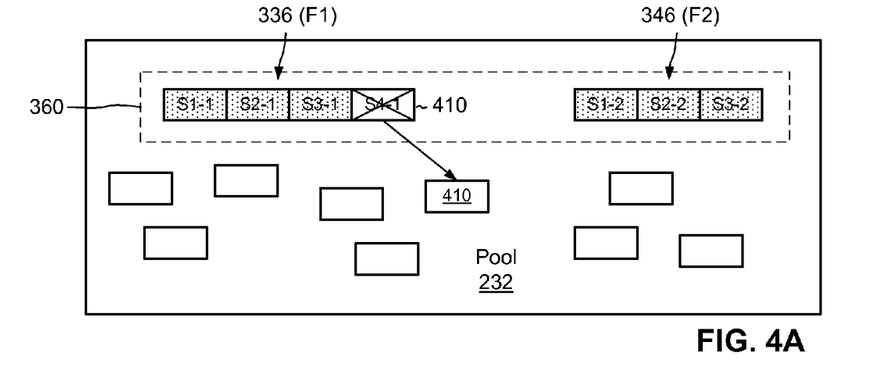
FIGS. 4A-4C are a series of block diagrams showing an example way in which a slice used to store a first file representing a LUN is reallocated for use by a second file representing a host file system.
Figure 4B:
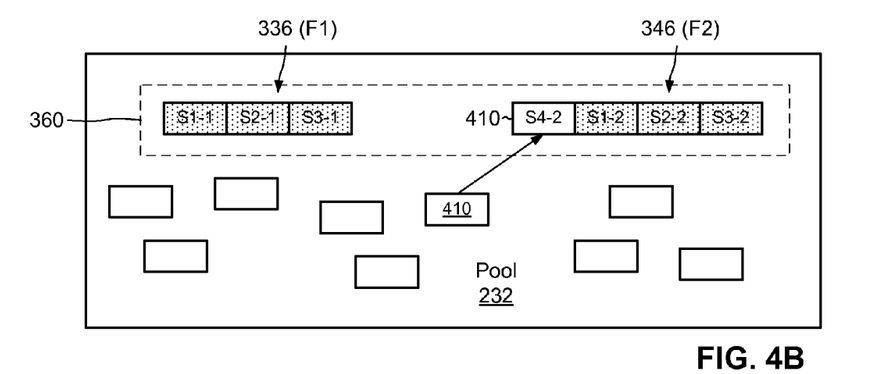
Figure 4C:
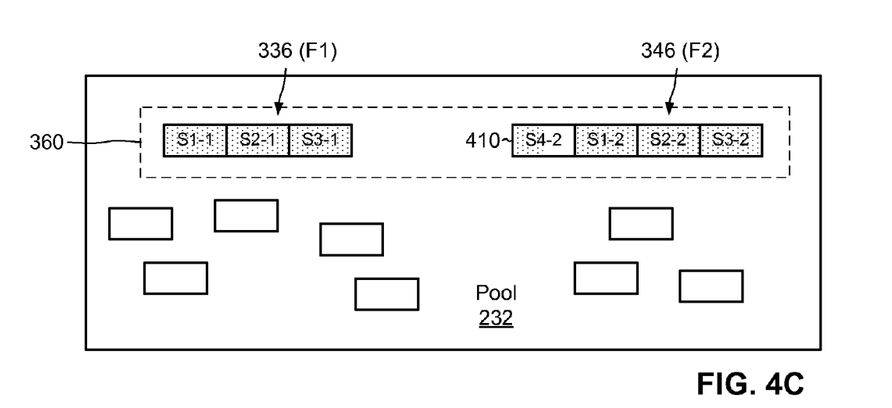

FIGS. 4A-4C show a sequence of events for reusing a slice 410 that once stored portions of the first file 336 for storing portions of the second file 346 when the slice 410 is no longer required by the first file 336. In FIG. 4A, it is shown that slice S4-1 (also labeled 410), which previously stored data for the first file 336, has become empty. This may occur, for example, when data is deleted from the LUN 310. In response to the slice S4-1 (410) becoming empty, the storage pool 232 deallocates the slice 410 from the set of file systems 230 and makes the slice 410 available.

In FIG. 4B, the free slice 410 is reallocated to the set of file systems 230 for use by the second file 346. Thus, the slice 410 becomes a newly added slice S4-2. In an example, the pool 232 reallocates the slice 410 to the set of file systems in response to the second file 346 requiring additional storage. This may occur, for example, in response to the HFS 312 growing to accommodate additional, or larger, files.

In FIG. 4C, with the first file 346 still storing data for the LUN 310, the slice 410 has become part of the second file 346 (as slice S4-2) and additional data for the second file 346 are stored on the newly acquired slice.

In the manner shown, a slice first used by the LUN 310 is reused by the HFS 312. Thus, storage space originally used for storing block-based data is reused for storing file-based data. Although FIGS. 4A-4C show block-based storage being reused for file-based storage, it is evident that file-based storage can also be reused for block-based storage. For example, the slice 410 can be released from the second file 346 and reused by the first file 336. Thus, inefficiencies of stranded storage are significantly reduced or eliminated.

Figure 5:
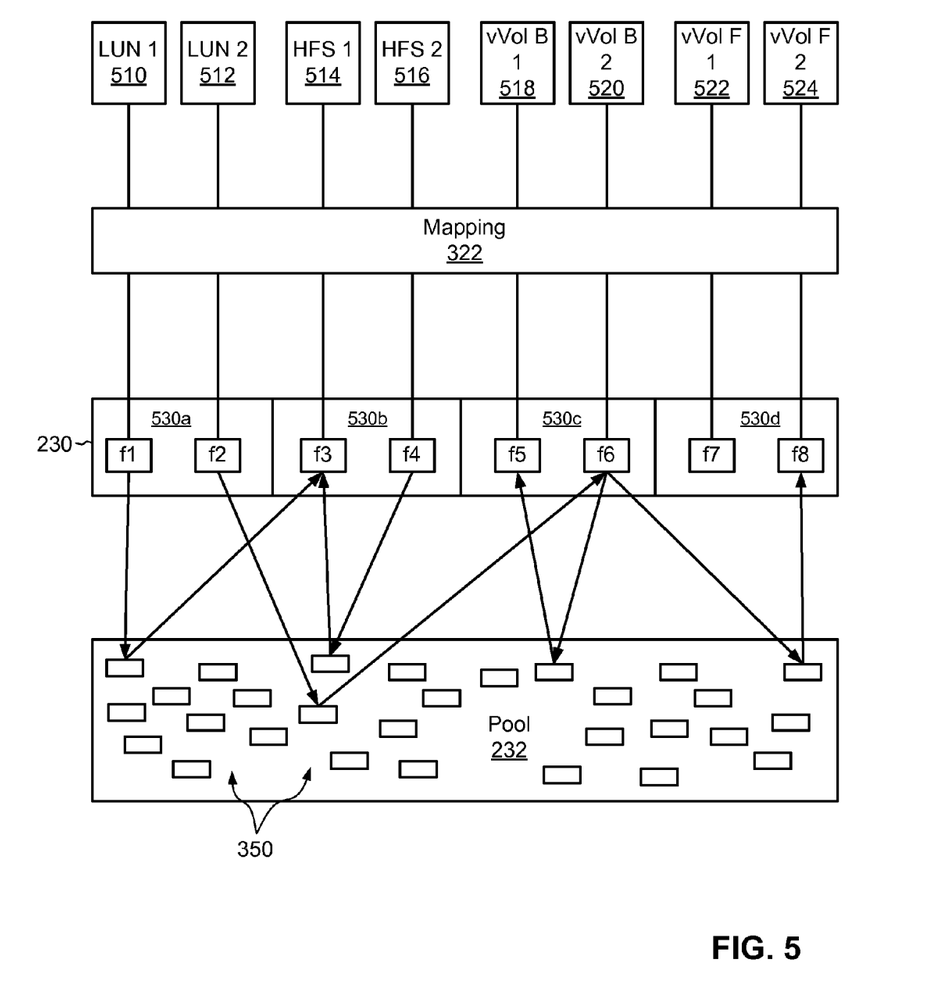
FIG. 5 is a block diagram showing an example manner in which storage slices from the storage pool can be reused by different files of the lower-deck file systems.

FIG. 5 shows a flexible manner in which files of lower-deck file systems can store a variety of host objects and how slices can be readily reused across different files. Here, files f1 and f2 within a lower-deck file system 530a store file representations of LUNs 510 and 512. Also, files f3 and f4 within a lower-deck file system 530b store file representations of host file systems 514 and 516. Additional host objects are stored, including block-based vVols 518 and 520 in files f5 and f6 (in a lower-deck file system 530c), and file-based vVols 522 and 524 in files f7 and f8 (in a lower-deck file system 530d). As is known, vVols are virtual storage volumes that are associated with particular virtual machines. In an example, any of the hosts 110(1-N) may run a virtual machine, which references a vVol stored on the data storage apparatus 116.

As illustrated with the arrows extending between the files f1 through f8 and slices 350 in the pool 232, slices used for any of the files f1 through f8 can be deallocated when they are no longer needed and reallocated for use with other files as those files require additional storage. As all host objects (e.g., LUNs, host file systems, block-based vVols, or file-based vVols) are represented as files, slices may be readily exchanged among them. Stranded storage is thus avoided for all of these host object types.

Figure 6:
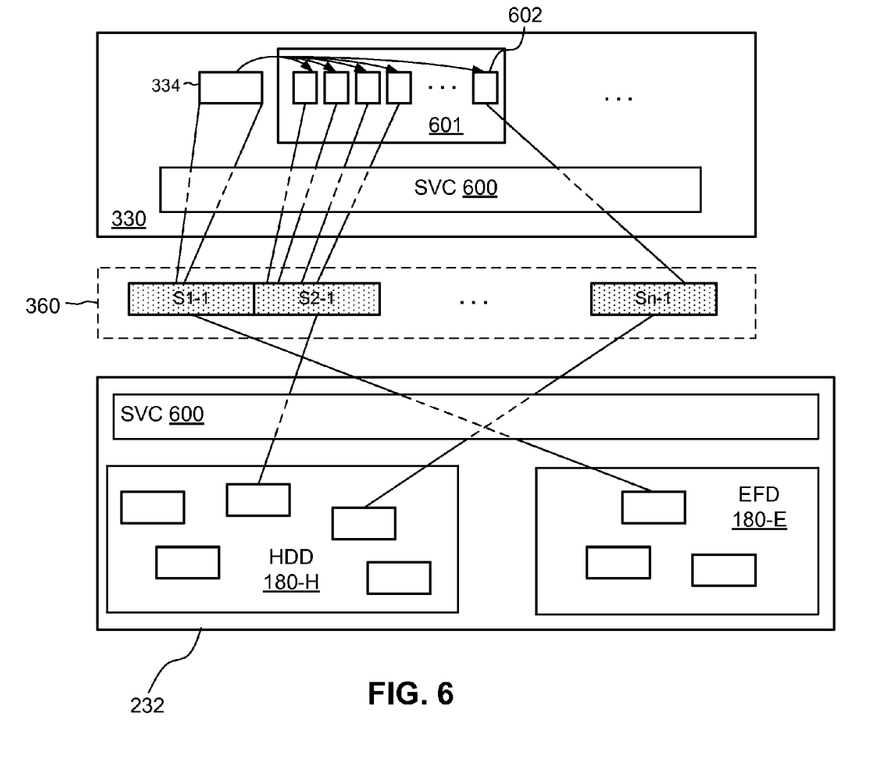
FIG. 6 is a schematic diagram of a portion of the IO stack showing service levels.

FIG. 6 shows a further aspect of the storage system, specifically one or more service layers 600 for providing enhanced data services in connection with the storage of host objects. These include block-based host objects and file-based host objects, such as the LUNs 310 and host file systems 312 respectively of FIG. 3. As described above, both of these types of host objects (block-based and file-based) are stored in files (e.g., files 336, 346 in FIG. 3; shown as 601 in FIG. 6) of lower-deck file systems 330. In FIG. 6 the service layers 600 are shown as residing in a file system 330 and/or as part of the pool 232. In general, enhanced data services as described herein are provided at or below the level of the lower-deck file systems 330, thereby supporting both block-based and file-based services provided to the hosts 110 by operating on the same file abstraction utilized by both. Enhanced data services provide transformations (static or dynamic) of the original object form of the host object to a service-specified form used at lower levels to achieve the desired performance objective. Several specific examples of such services and their transformations are provided below.

FIG. 6 also shows the structure of a file 601 of a lower-deck file system 330. The data of the file is distributed across a set of fixed-size blocks 602. These are mapped to respective slices Sx-1 such as shown. Also illustrated is the manner in which the slices Sx-1 are allocated from the pool 232. As indicated above, the pool 232 draws underlying storage from either or both HDD storage 180-H and EFD storage 180-E. In this simplified example a first slice S1-1 used to store inodes 334 resides on EFD 180-E, while the other slices reside on HDD 180-H. The EFD 180-E may be used for the metadata slice S1-1 to enable higher performance of the file system 330, due to the relatively high frequency and latency sensitivity of the accesses to the metadata slice S1-1.

FIG. 6 illustrates what is referred to as a "basic" level of data storage service provided by the pool layer 232, file system layer 230 and mapping layer 228 collectively. The service is basic in the sense that it substantially mirrors the block-by-block original-object structure of the file 601 onto the slices Sx, albeit with a flexible block placement that enables the slices Sx to be used most efficiently. That is, each block 602 is mapped to and stored as a corresponding block of a slice Sx. If the file 601 contains 150 blocks 602, then a corresponding 150 blocks of slices Sx are used. Also, basic service implies a default use of a certain type of storage 180 for the slices Sx of the file 330, such as the relatively lower-performance HDD 180-H rather than the EFD 180-E. There may be a higher-level mechanism for assigning individual files 330 to EFD 180-E rather than HDD 180-H, but even in this case the assignment is generally static absent operator intervention.

Figure 7:
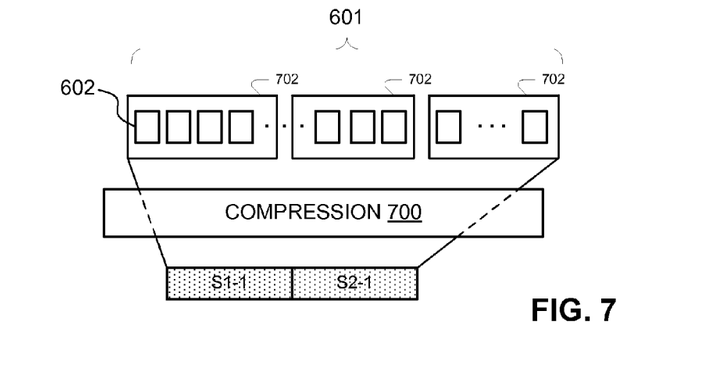
FIGS. 7-9 are schematic diagrams illustrating a compression service, an automated storage tiering service, and a data deduplication service respectively.
Figure 8:
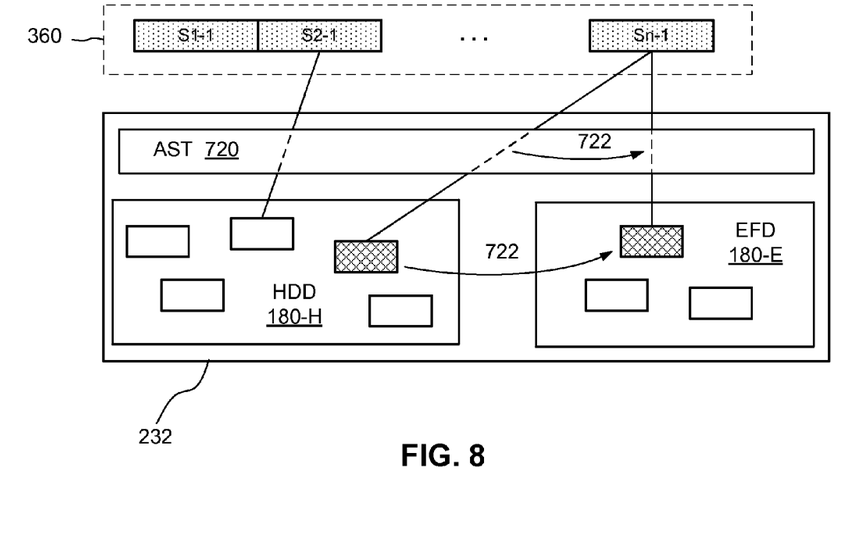
Figure 9:
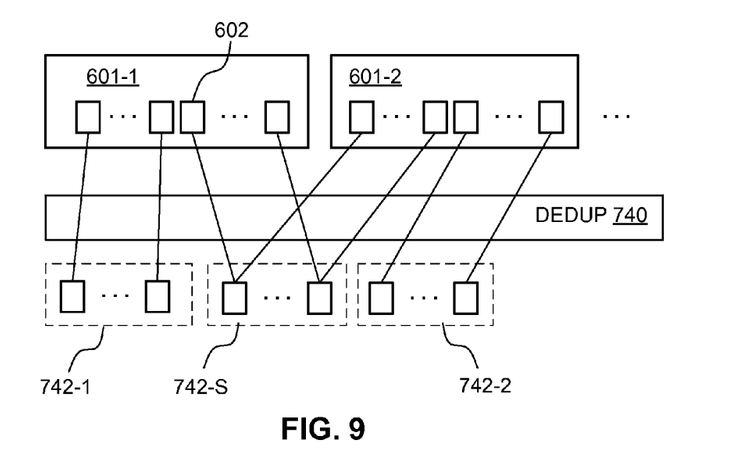

FIGS. 7-9 show certain enhanced data services that employ the structure of FIG. 6. In each case, the mapping of the blocks 602 of the file 601 to the storage 180 is modified from that of the basic service. FIG. 7 describes a data compression service; FIG. 8 describes an automated storage tiering (AST) service; and FIG. 9 describes a data deduplication (DEDUP) service. Again, it will be appreciated that because these services are provided at or below the lower-deck file system layer 230, they readily support both block and file host objects (i.e., LUNs 310 and HFSs 312) that rely on the file abstraction of the underlying physical storage.

FIG. 7 illustrates a data compression service 700, which might be deployed in file system 330 or between the file system 330 and the pool 232. The blocks 602 of the file 601 are shown in slice-sized sets 702, i.e., within each set 702 is the fixed number of blocks 602 corresponding to the size of a slice Sx. In the case of 8 Kbyte blocks and 256 Mbyte slices, for example, each set 702 has 32 K blocks 602. The compression service 700 applies a compression encoding to the sets 702 to generate a compressed representation stored on underlying slices Sx, where generally the number of slices required for the underlying storage is considerably less than the size of the file as measured in slice-sized sets 702. In the simplified example of FIG. 7, the data of three sets 702 are compressed into two slices S1-1 and S2-1 as shown. In operation, the compression service 700 also performs the inverse operation, decompression, on the slices Sx to re-generate the original sets 702 of blocks 602 according to the original object form from a host 110.

Any of a variety of specific data compression algorithms may be used by the compression service 702, and the specific algorithm may vary depending on more specific type information about the host object. Different types of algorithms have been developed for text and media, for example, and for media there are different types of algorithms for images, video and audio for example. The compression service 700 may provide only one type of compression, which may be applied to all or selected ones of the files 601 of a file system 330. Alternatively, the compression service 700 may provide multiple types of compression and include a mechanism for selectively applying these to corresponding host objects as appropriate (i.e., audio compression to audio files, etc.). In this respect, the upper layers (e.g., host object layer 226, mapping layer 228) may provide object type information that can form metadata for files 601 of a lower-deck file system 330, such metadata being usable by the service(s) 600 for the purpose of selecting appropriate compression for each file 601.

FIG. 8 illustrates the automated storage tiering (AST) service 720, which is provided at the level of the storage pool 232. While the compression service 700 achieves enhanced data storage in form of increased storage usage efficiency (ability to store more user data for a given size or amount of underlying storage 180), the AST service 720 provides the ability to achieve a desired balance between storage usage efficiency and performance (e.g., latency and throughput). Data is automatically and dynamically moved between storage-efficient HDD 180-H and the higher-performance EFD 180-E according to patterns of usage of the data, favoring the faster EFD 180-E for more frequently accessed data and the denser HDD 180-H for less frequently accessed data.

As shown in FIG. 8, the AST service 720 manages the assignment of the slices Sx to the pool 232. In the simplified example shown, slice Sn-1 is initially provided from the HDD storage 180-H. This may correspond, for example, to an initial assignment when the slice is created and assigned for use by the file system 601. During operation, the AST service 720 monitors the pattern of access (reads and/or writes) of the slice Sn-1, and upon this pattern meeting some threshold the slice is automatically reassigned (indicated by arrows 722) to the EFD 180-E. It will be appreciated that this reassignment involves atomically reading the slice from the HDD 180-H and writing it to the EFD 180-E, along with updating any data structures or other mechanisms that reflect the location of the slice in storage 180. There may be a similar mechanism for moving slices in the other direction, i.e., from EFD 180-E to HDD 180-H. Algorithms for automated storage tiering are generally known and not elaborated herein. Although in the example of FIG. 8 there are only two storage types or tiers 180-E and 180-H, in general there may be any number of tiers and corresponding algorithms and thresholds for automatically transferring slices among them.

FIG. 9 illustrates the deduplication service (DEDUP) 740. Like the compression service 700, it provides for enhanced data storage in the form of greater storage usage efficiency. In particular, in one embodiment it operates across a set of multiple files 601 of a given file system 330. The corresponding host objects (e.g., LUNs 310 or HFSs 312) stored in the files 601 form a "deduplication domain" in which duplicate data elements are removed and replaced with pointers to shared single instances of the data elements. In the illustrated example, the deduplication service 740 detects blocks 602 that are identical between two or more files 601, and instead of storing each identical copy the deduplication service 740 stores only one instance and provides a pointer for each file 601 to the stored copy. This is illustrated in FIG. 9 by the mapping from the original object form of files 601-1 and 601-2 to three sets 742 of blocks: one set 742-1 unique to file 601-1, one set 742-2 unique to file 601-2, and a third set 742-S that are shared between the two files 601. It will be appreciated that the three sets 742 consume less overall storage space than the complete set of blocks 602 for both files 601-1 and 601-2. Techniques for providing such block-based deduplication are generally known in the art and are not elaborated further herein.

Although FIG. 9 shows a deduplication domain as including multiple files 601, in some cases it may be useful to apply deduplication even within a single file 601. This may be the case, for example, when the single file 601 stores a host file system 312, which in general may include large numbers of individual files with replicated contents.

In alternative embodiments, there may be multiple pools 232 in a given storage device, and each pool 232 includes a deduplication "container" providing a single deduplication domain for the pool. Within a deduplication domain many files 601 may be hosted along with respective snaps. Each of the files 601 may be hosting different object types such as LUN, vVol and host file system. Such an arrangement enables block level deduplication across all these different objects.

It should also be noted that the services of the service layers 600 are not necessarily mutually exclusive. For example, files 601 in a deduplication container may be compressed in addition to being deduplicated to further improve the storage efficiency.

Figure 10:
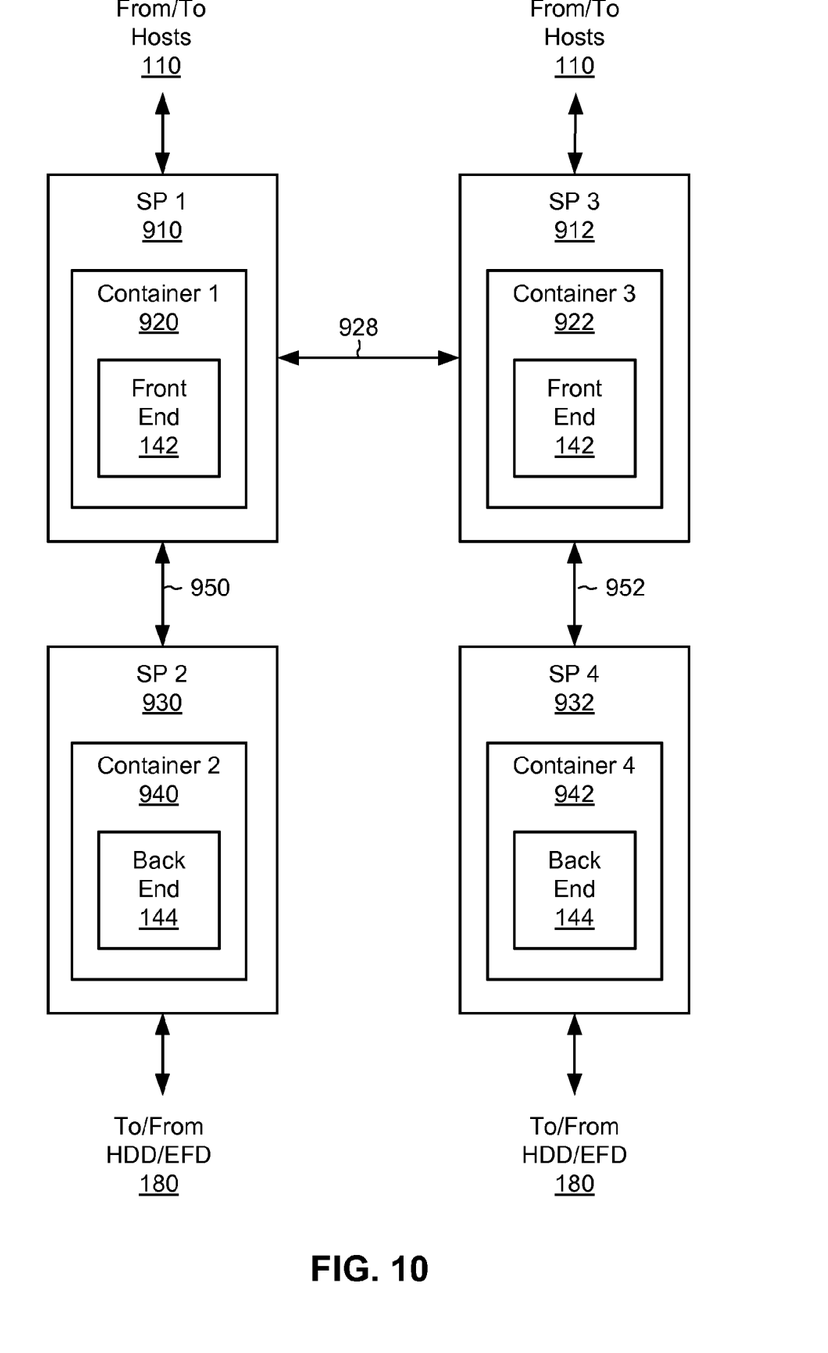
FIG. 10 is a block diagram showing an example arrangement involving three storage processors in a modular arrangement, where two storage processors are configured to run front ends and one storage processor is configured to run a back end.
Figure 11:
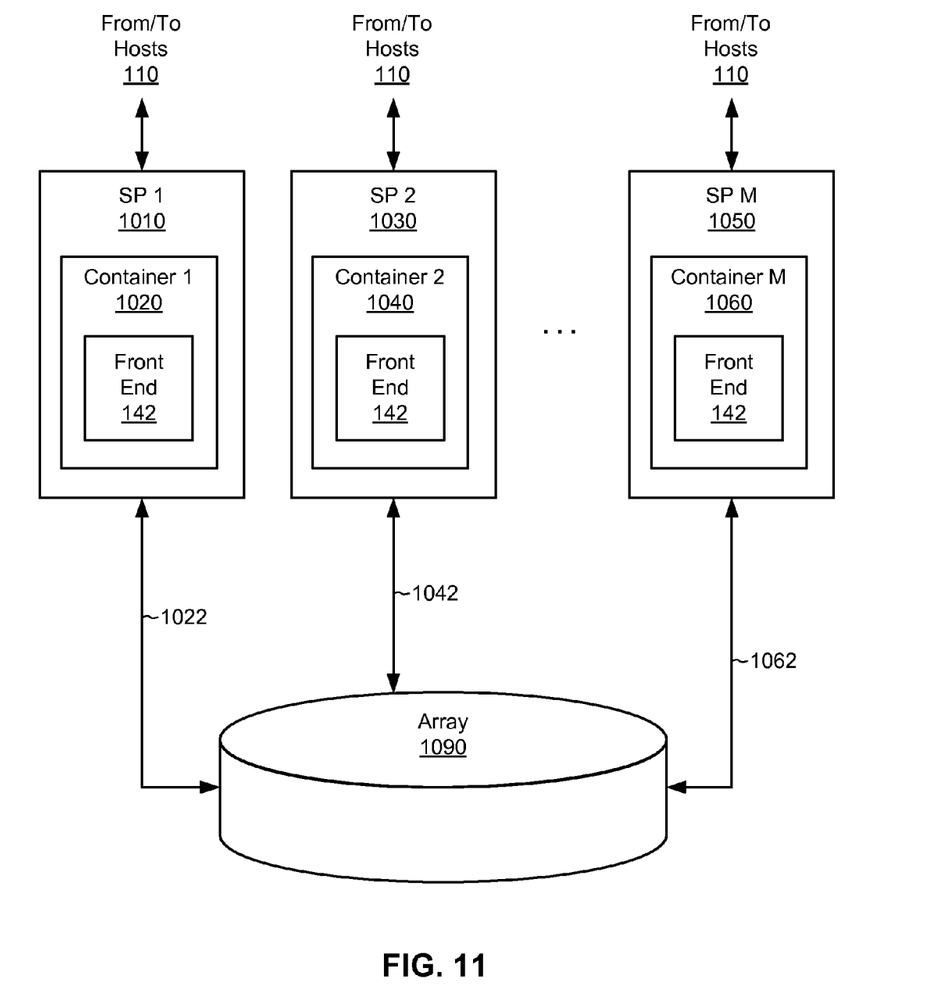
FIG. 11 is a block diagram that shows an example arrangement in which multiple storage processors run respective front ends and are connected in a gateway configuration to a data storage array.

FIGS. 10 and 11 show different deployments of the IO stack 140. In FIG. 10, a modular deployment is shown in which a first SP 910 houses a front end 142 in a first container 920 and a second SP 930 houses the back end 144 in a second container 940. An interconnection 950 is formed between the first SP 910 and the second SP 930. In an example, the interconnection 950 is made using Fibre Channel or some other block-based protocol. To support cache mirroring (via connection 928), as well as other functions, a parallel arrangement may be formed with a third SP 912 housing a front end 142 in a third container 922 and a fourth SP 932 housing a back end 144 in a fourth container 942. An interconnection 952 is formed between the third SP 912 and the fourth SP 932. With this arrangement, performance gains can be realized over the integrated configuration of FIG. 1, because the modular configuration dedicates the computing and memory resources of multiple SPs to handling host IOs, and because each SP is optimized for operating as a front end or as a back end but is not required to operate as both. Also, although the first SP 910, the second SP 930, the third SP 912, and fourth SP 932 are physical SPs, any of the SPs housing front ends 142 (SP1 and SP3) can themselves house any number of virtualized storage processors.

FIG. 11 shows a gateway arrangement, in which multiple SPs 1010, 1030, . . . , 1050 each house a front end 142 in respective containers 1020, 1040, . . . , 1060. Interconnections 1022, 1042, . . . , 1062 (such as Fibre Channel) respectively connect the SPs 1010, 1030, . . . , 1050 to an array 1090. The array 1090 includes its own internal back end, for responding to block-based IOs. Although three SPs are shown providing front ends 142, it is understood that a greater or lesser number of SPs providing front ends 142 may be provided. Also, cache mirroring and other functions may be best supported by providing SPs in pairs. Thus, the number of SPs in the gateway arrangement is preferably even. Suitable examples of the array 1090 include the VMAX® and VPLEX® storage arrays available from EMC Corporation of Hopkinton, Mass.

Figure 12:
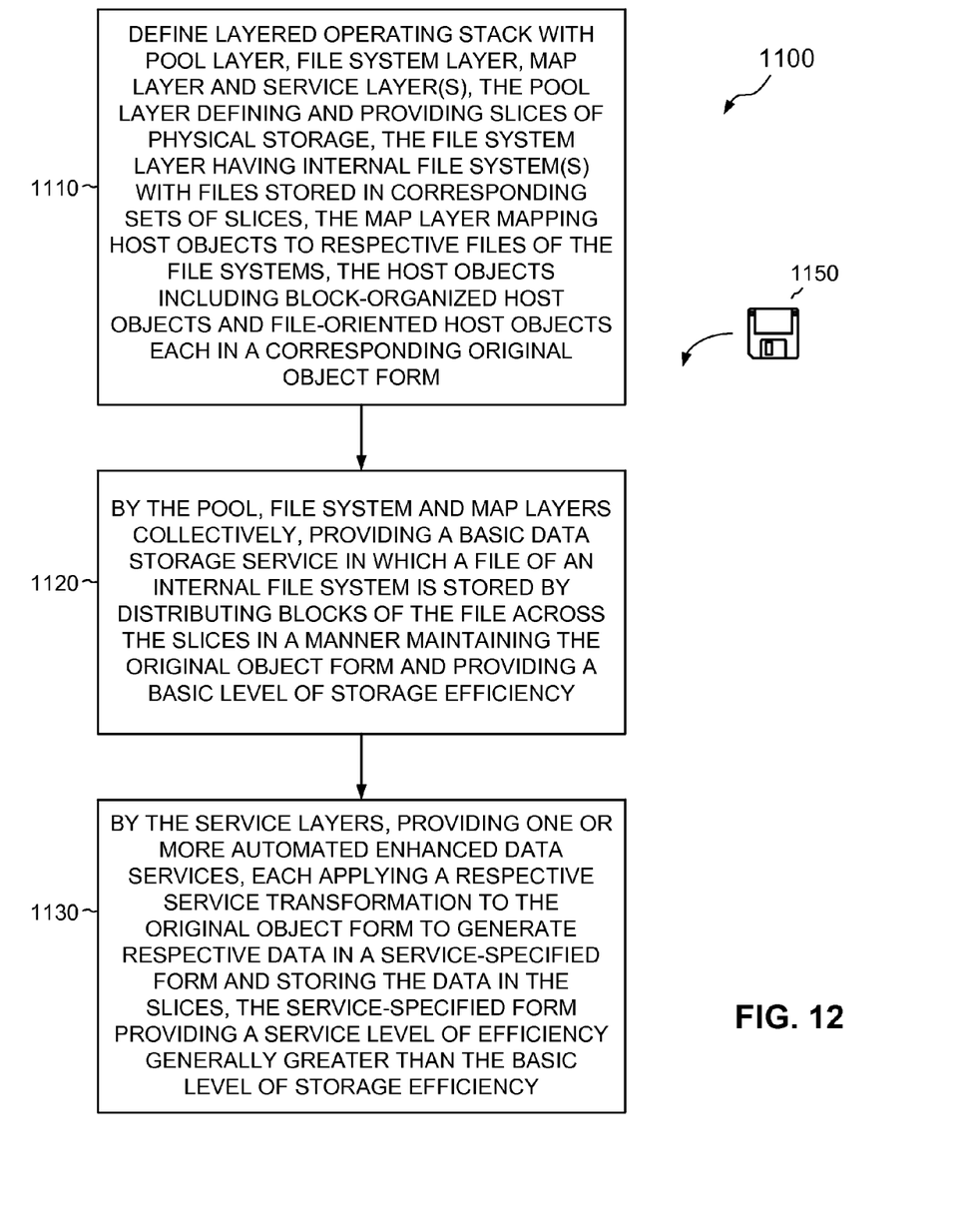
FIG. 12 is a flowchart showing an example process for managing host data of a set of hosts in the data storage apparatus of FIG. 1.

FIG. 12 shows an example method 1100 for managing host data of a set of hosts in a data storage apparatus. The method 1100 that may be carried out in connection with the data storage apparatus 116. The method 1100 is typically performed by the software constructs, described in connection with FIGS. 1 and 2, which reside in the memory 130 of the storage processor 110 and are run by the set of processors 124. The various acts of the method 1100 may be ordered in any suitable way. Accordingly, embodiments may be constructed in which acts are performed in orders different from those illustrated, which may include performing some acts simultaneously, even though the acts are shown as sequential in the illustrated embodiments.

At 1110, a layered operating stack is defined including a pool layer 232, a file system layer 230, a map layer 228 and one or more service layers 600. The pool layer 232 defines and provides slices of the physical storage 180 for storing host data. The file system layer 230 includes one or more file systems 330 with respective files 601 stored in corresponding sets of slices Sx. The map layer 228 maps host objects to respective files 601 of the file systems 330, where the host objects include block-organized logical units (LUNs) 310 and file-oriented host file systems (HFSs) 312 each in a corresponding original object form.

At 1120, the pool, file system and map layers (232, 230 and 228) collectively provide a basic data storage service in which a file 601 of a file system 330 is stored by distributing blocks 602 of the file 601 across the slices Sx in a manner maintaining the original object form and providing a basic level of storage efficiency, as described above in connection with FIG. 6.

At 1130, the service layer(s) provide one or more automated enhanced data services, each applying a respective service transformation to the original object form to generate respective data in a service-specified form and storing the data in the slices Sx. The service-specified form provides a service level of efficiency generally greater than the basic level of storage efficiency. Examples include a compression service 700 an deduplication service 740 that provide for greater storage efficiency, i.e., consuming less physical storage 180 for a given size host object. In another example, an automated storage tiering service 720 provides for efficiency in terms of a desired balance between storage efficiency and performance, as described above.

An improved technique has been described for a data storage apparatus that combines both block-based and file-based functionality in a unified data path architecture. The improved technique brings together IO processing of block-based storage systems and file-based storage systems by expressing both block-based objects and file-based objects in the form of files. These files are parts of an underlying, internal set of file systems, which are stored on a set of storage units served by a storage pool. Because block-based and file-based objects are all expressed as files of this set of file systems, a common set of services can be applied across block-based and file-based objects. Also, storage units released by any file or files of the underlying, internal set of file systems can be reused by any other file or files, regardless of whether the files represent LUNs, file systems, vVols, and so forth. Inefficiencies of stranded storage are thus greatly reduced or completely eliminated.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments. In addition, the word "set" as used herein indicates one or more of something, unless a statement is made to the contrary.

Having described certain embodiments, numerous alternative embodiments or variations can be made. For example, the lower-deck file systems 230 have been described as storing file representations of LUNs, host file systems, block-based vVols, file-based vVols, and snaps of any of the foregoing. These are merely examples, however. Other types of objects may be stored in the lower-deck file systems 230 as file representations, such as virtual hard disks (VHDs), virtual machine disks (VMDKs), internal file systems used by the data storage apparatus 116, and internal volumes, for example.

In addition, as shown and described, different types of objects (LUNs, host file systems, etc.) are shown and described as being stored in respective lower-deck file systems. This is merely an example, however. Alternatively, any of LUNs, host file systems, block-based vVols, and file-based vVols, as well as snaps of any of the foregoing, may be included together in a single lower-deck file system or in any number of lower-deck file systems. Thus, it is not required that files representing different types of objects be stored in different lower-deck file systems.

Also, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 1150 in FIG. 12). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Those skilled in the art will therefore understand that various changes in form and detail may be made to the embodiments disclosed herein without departing from the scope of the invention.

What is claimed is:

1. A data storage system, comprising:
a back-end interface to physical storage;
a front-end interface to a communications network coupling the data storage system to one or more host computers; and
one or more storage processors configured to execute computer program instructions to cause the data storage system to provide data storage services to the host computers using the physical storage by:
defining a layered operating stack including a pool layer, a file system layer, a map layer and one or more service layers, the pool layer defining and providing slices of the physical storage for storing host objects, the file system layer having one or more internal file systems with respective files stored in corresponding sets of slices of the physical storage, the map layer mapping the host objects to respective files of the one or more internal file systems, the host objects including block-organized host objects and file-oriented host objects, each of the block-organized host objects and the file-oriented host objects is in a corresponding original object form;
by the pool layer, the file system layer and the map layer collectively, providing a basic data storage service for storing a file of one of the one or more internal file systems by distributing blocks of the file across a set of slices of the physical storage, maintaining original object form of the stored file, and providing a basic level of storage efficiency; and by the service layers, providing one or more automated enhanced data services, each automated enhanced data service applying a respective service transformation to the original object form to generate respective data in a service-specified form and storing the respective data in the slices, the service-specified form providing a service level of storage efficiency generally greater than the basic level of storage efficiency.

2. A data storage system according to claim 1, wherein the basic level of storage efficiency and the service levels level of storage efficiency are respective levels of storage capacity usage efficiency, and wherein the service-specified form is of smaller data size than original object form.

3. A data storage system according to claim 2, wherein the one or more automated enhanced data services include an automatic data compression service operative to apply data compression to each of one or more files of one of the one or more internal file systems to generate respective compressed forms of the one or more files.

4. A data storage system according to claim 3, wherein:
the host objects are of a plurality of respective types selected from text and media;
the respective files for the host objects are accompanied by respective indicators of respective host object types of the host objects; and
the automatic data compression service is operative in response to the respective indicators of the respective host object types to apply respective distinct compression algorithms to the respective files to which the host objects of different host object types are mapped.

5. A data storage system according to claim 2, wherein the one or more automated enhanced data services include an automatic data deduplication service operative to apply deduplication to blocks of one or more files of one of the internal file systems to replace duplicate data blocks with respective pointers to corresponding shared single instances.

6. A data storage system according to claim 5, wherein a pool of the pool layer includes a deduplication container providing a single deduplication domain for the pool.

7. A data storage system according to claim 6, wherein the single deduplication domain hosts a plurality of the files storing host objects of different types, a first file storing a block-organized host object, and a second file storing a file-oriented host object, the deduplication service applying deduplication across the host objects of different types.

8. A data storage system according to claim 6, wherein the one or more automated enhanced data services further include an automatic data compression service to compress files in the deduplication container to further improve storage efficiency.

9. A data storage system according to claim 1, wherein:
the slices of the pool layer are drawn from distinct tiers of the physical storage having respective storage usage efficiency and performance characteristics;
the one or more automated enhanced data services include an automated storage tiering service providing the service level of storage efficiency by automated and dynamic selection among the distinct tiers of the physical storage for the slices to achieve a desired balance of performance and storage usage efficiency.

10. A data storage system according to claim 9, wherein the physical storage include magnetic disk drives and electronic flash drives each forming a respective tier, the magnetic disk drive tier providing a first storage density and first access time, the electronic flash drive tier providing a lower storage density and faster access time.

11. A data storage system according to claim 1, wherein the block-organized host objects include one or more logical storage units (LUNs) and the file-oriented host objects include one or more host file systems, each host file system being stored in a single file of one of the one or more internal file systems.

12. A data storage system according to claim 1, wherein the service layers are provided between the file system layer and the physical storage and operate upon the respective files of the one or more internal file systems for supporting both the block-organized host objects and the file-oriented host objects by operating on respective ones of the respective files that are mapped by the host objects.

13. A data storage system according to claim 12, wherein the service layers include at least one of a first service layer and a second service layer, the first service layer provided between the file system layer and the pool layer and creating the service-specified form as service-specified content and organization of the slices as distinct from a basic content and organization of the slices, the second service layer provided between the pool layer and the physical storage and creating the service-specified form as service-specified mapping of the slices to the physical storage as distinct from a basic mapping of the slices to the physical storage.

14. A data storage system according to claim 1, wherein data of each of the respective files of the one or more internal file systems is distributed across one or more respective sets of multiple fixed-size blocks, each set of multiple fixed-size blocks for a file being mapped to a respective one of the slices of the pool layer.

15. A method of operating a data storage system having a back-end interface to physical storage and a front-end interface to a communications network coupling the data storage system to one or more host computers, comprising:
defining a layered operating stack including a pool layer, a file system layer, a map layer and one or more service layers, the pool layer defining and providing slices of the physical storage for storing host objects, the file system layer having one or more internal file systems with respective files stored in corresponding sets of slices of the physical storage, the map layer mapping the host objects to respective files of the internal file systems, the host objects including block-organized host objects and file-oriented host objects, each of the block-organized host objects and the file-oriented host objects is in a corresponding original object form;
by the pool layer, the file system layer and the map layer collectively, providing a basic data storage service for storing a file of one of the one or more internal file systems by distributing blocks of the file across a set of slices of the physical storage, maintaining original object form of the stored file, and providing a basic level of storage efficiency; and
by the service layers, providing one or more automated enhanced data services, each automated enhanced data service applying a respective service transformation to the original object form to generate respective data in a service-specified form and storing the data in the slices, the service-specified form providing a service level of storage efficiency generally greater than the basic level of storage efficiency.

16. A method according to claim 15, wherein the basic level of storage efficiency and the service level of storage efficiency are respective levels of storage capacity usage efficiency, and wherein the service-specified form is of smaller data size than original object form.

17. A method according to claim 16, wherein the one or more automated enhanced data services include an automatic data compression service operative to apply data compression to each of one or more files of the one or more internal file systems to generate respective compressed forms of the one or more files.

18. A method according to claim 17, wherein:
the host objects are of a plurality of respective types selected from text and media;
the respective files for the host objects are accompanied by respective indicators of respective host object types of the host objects; and
the automatic data compression service is operative in response to the respective indicators of the respective host object types to apply respective distinct compression algorithms to the respective files to which the host objects of different host object types are mapped.

19. A method according to claim 16, wherein the one or more automated enhanced data services include an automatic data deduplication service operative to apply deduplication to blocks of one or more files of an internal file system to replace duplicate data blocks with respective pointers to corresponding shared single instances.

20. A method according to claim 19, wherein a pool of the pool layer includes a deduplication container providing a single deduplication domain for the pool.

21. A method according to claim 20, wherein the single deduplication domain hosts a plurality of the files storing host objects of different types, a first file storing a block-organized host object, and a second file storing a file-oriented host object, the deduplication service applying deduplication across the host objects of different types.

22. A method according to claim 20, wherein the one or more automated enhanced data services further include an automatic data compression service files to compress the files in the deduplication container to further improve storage efficiency.

23. A method according to claim 15, wherein:
the slices of the pool layer are drawn from distinct tiers of the physical storage having respective storage usage efficiency and performance characteristics;
the one or more automated enhanced data services include an automated storage tiering service providing the service level of storage efficiency by automated and dynamic selection among the distinct tiers of the physical storage for the slices to achieve a desired balance of performance and storage usage efficiency.

24. A method according to claim 23, wherein the physical storage include magnetic disk drives and electronic flash drives each forming a respective tier, the magnetic disk drive tier providing a first storage density and first access time, the electronic flash drive tier providing a lower storage density and faster access time.

25. A method according to claim 15, wherein the block-organized host objects include one or more logical storage units (LUNs) and the file-oriented host objects include one or more host file systems, each host file system being stored in a single file of one of the one or more internal file systems.

26. A computer program product having a non-transitory computer readable medium including instructions which, when executed by one or more storage processors of a data storage system cause the data storage system to provide data storage services to the host computers using physical storage, including:
defining a layered operating stack including a pool layer, a file system layer, a map layer and one or more service layers, the pool layer defining and providing slices of the physical storage for storing host objects, the file system layer having one or more internal file systems with respective files stored in corresponding sets of slices of the physical storage, the map layer mapping the host objects to respective files of the one or more internal file systems, the host objects including block-organized host objects and file-oriented host objects, each of the block-organized host objects and the file-oriented host objects is in a corresponding original object form;
by the pool, file system and map layers collectively, providing a basic data storage service for storing a file of one of the one or more internal file systems by distributing blocks of the file across a set of slices of the physical storage, maintaining original object form of the stored file, and providing a basic level of storage efficiency; and
by the service layers, providing one or more automated enhanced data services, each automated enhanced data service applying a respective service transformation to the original object form to generate respective data in a service-specified form and storing the data in the slices, the service-specified form providing a service level of efficiency generally greater than the basic level of storage efficiency.

* * * * *